US012146417B2

(12) United States Patent
Sippel

(10) Patent No.: US 12,146,417 B2
(45) Date of Patent: Nov. 19, 2024

(54) TURBINE SHROUD WITH CERAMIC MATRIX COMPOSITE BLADE TRACK SEGMENTS AND METHOD OF ASSEMBLY

(71) Applicant: Rolls-Royce Corporation, Indianapolis, IN (US)

(72) Inventor: Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/113,386

(22) Filed: Feb. 23, 2023

(65) Prior Publication Data

US 2024/0287915 A1 Aug. 29, 2024

(51) Int. Cl.

| | |
|---|---|
| ***F01D 11/00*** | (2006.01) |
| ***F01D 11/08*** | (2006.01) |
| ***F01D 11/12*** | (2006.01) |
| ***F01D 25/00*** | (2006.01) |
| ***F01D 25/24*** | (2006.01) |

(52) U.S. Cl.

CPC .......... *F01D 25/005* (2013.01); *F01D 11/005* (2013.01); *F01D 11/08* (2013.01); *F01D 11/12* (2013.01); *F01D 11/122* (2013.01); *F01D 25/243* (2013.01); *F05D 2220/32* (2013.01); *F05D 2240/55* (2013.01); *F05D 2300/6033* (2013.01)

(58) Field of Classification Search

CPC ........ F01D 11/08; F01D 11/12; F01D 11/122; F01D 25/005; F01D 11/005; F01D 25/243; F05D 2220/32; F05D 2240/55; F05D 2300/6033

See application file for complete search history.

(56) References Cited

U.S. PATENT DOCUMENTS

| | | | | |
|---|---|---|---|---|
| 10,968,782 | B2 | 4/2021 | Spangler et al. | |
| 10,989,059 | B2 | 4/2021 | Clark et al. | |
| 11,021,987 | B2 | 6/2021 | Clark et al. | |
| 11,047,250 | B2 | 6/2021 | Barker et al. | |
| 11,051,473 | B2 | 7/2021 | Wolf | |
| 11,066,947 | B2 | 7/2021 | Sippel et al. | |
| 11,073,038 | B2 | 7/2021 | Blaney et al. | |
| 11,085,316 | B2 | 8/2021 | Blaney et al. | |
| 11,125,098 | B2 | 9/2021 | Blaney et al. | |
| 11,248,482 | B2 | 2/2022 | Blaney et al. | |
| 11,274,569 | B2 | 3/2022 | Ennacer et al. | |
| 11,326,463 | B2 * | 5/2022 | Blaney | F01D 25/246 |
| 11,352,902 | B2 | 6/2022 | Lewis | |
| 11,454,130 | B2 | 9/2022 | Barker et al. | |
| 11,519,283 | B2 | 12/2022 | Thill et al. | |
| 2007/0025837 | A1 * | 2/2007 | Pezzetti | F01D 25/246 415/115 |
| 2020/0040756 | A1 * | 2/2020 | Clark | F01D 11/08 |
| 2020/0149418 | A1 * | 5/2020 | Whittle | F01D 5/284 |
| 2020/0325789 | A1 * | 10/2020 | Clark | F02K 3/06 |

* cited by examiner

*Primary Examiner* — David E Sosnowski
*Assistant Examiner* — Theodore C Ribadeneyra
(74) *Attorney, Agent, or Firm* — Barnes & Thornburg LLP

(57) ABSTRACT

Turbine shroud structures and a method of assembling a turbine shroud into a turbine are disclosed. The method includes arranging turbine shroud segments into a full ring and inserting the full ring into a turbine case as a single unit.

7 Claims, 3 Drawing Sheets

TURBINE SHROUD WITH CERAMIC MATRIX COMPOSITE BLADE TRACK SEGMENTS AND METHOD OF ASSEMBLY

FIELD OF THE DISCLOSURE

The present disclosure relates generally to turbine shroud rings having ceramic matrix composite components that define a gas path boundary, and more specifically to structure and steps suitable for assembly.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Shrouds sometimes include components made from ceramic matrix composite materials that can withstand high temperatures. Assembly of such components present challenges because of dissimilar material thermal expansion.

SUMMARY

The present disclosure may comprise one or more of the following features and combinations thereof.

A method of assembling a turbine including ceramic matrix composite heat shields may include several steps. In some embodiments, the method may include arranging a circumferential end of one turbine shroud segment adjacent to a circumferential end of another turbine shroud segment. Each turbine shroud segment may include a gas path panel consisting of ceramic matrix composite material, a forward hook, and an aft hook.

In some embodiments, the method may further include repeating the arranging step. The arranging step may be repeated until a full ring of turbine shroud segments is formed.

In some embodiments, the method may further include inserting the full ring of turbine shroud segments into a turbine case. The full ring of shroud segments may be inserted into the turbine case so that the forward hooks of the shroud segments engage a forward case hanger of the turbine case and the aft hooks of the shroud segments engage an aft case hanger of the turbine case.

In some embodiments, an innermost diameter of the aft case hangers may be greater than an outermost diameter of the forward hooks of the shroud segments. The innermost diameter of the aft case hangers may be greater than the outermost diameter of the forward hooks of the shroud segments so that the forward hooks of the full ring of turbine shroud segments are able to pass through the aft case hanger prior to engagement with the forward case hanger during insertion of the full ring of shroud segments into the turbine case.

In some embodiments, the method may further include chocking the circumferential end of each shroud segment together with the circumferential end of adjacent shroud segments. The adjacent shroud segments may be chocked to eliminate gaps between the shroud segments of the full ring of shroud segments prior to inserting the full ring of turbine shroud segments into the turbine case.

In some embodiments, at least one strip seal may extend from each turbine shroud segment into an adjacent turbine shroud segment. In some embodiments, each turbine shroud segment may include a carrier consisting of metallic materials that forms the forward hook and the aft hook of each shroud segment. In some embodiments, each turbine shroud segment may include a heat shield consisting of ceramic matrix composite materials that forms the gas path panel of the shroud segment.

In some embodiments, the carrier may include a mount panel. The forward hook may extend radially outwardly and forward from the mount panel. The aft hook may extend radially outwardly and forward from the mount panel.

In some embodiments, the method may further include temporarily coupling the full ring of turbine shroud segments to an assembly fixture. The full ring of shroud segments may be coupled to the assembly fixture to maintain relative location of the turbine shroud segments relative to one another prior to inserting the full ring of turbine shroud segments into the turbine case.

According to another aspect of the present disclosure, a turbine may include a turbine case and a full ring of shroud segments. The full ring of shroud segments may be coupled to the turbine case.

In some embodiments, the turbine case may include a case shell, a forward case hanger, and an aft case hanger. The case shell may extends around a central axis. The forward case hanger may extend radially inwardly and axially aftwardly from the case shell. The aft case hanger may extend radially inwardly and axially aftwardly from the case shell.

In some embodiments, each of the shroud segments may include a gas path panel consisting of ceramic matrix composite material, a forward hook, and an aft hook. The forward hook of each shroud segment may engage the forward case hanger of the turbine case. The aft hook of each shroud segments may engage the aft case hangers of the turbine case.

In some embodiments, an innermost diameter of the aft case hanger may be greater than an outermost diameter of the forward hooks of the full ring of shroud segments. The innermost diameter of the aft case hanger may be greater than the outermost diameter of the forward hooks of the full ring of shroud segments so that the forward hooks are able to pass through the aft case hanger prior to engagement with the forward case hanger during insertion of the full ring of shroud segments into the turbine case.

These and other features of the present disclosure will become more apparent from the following description of the illustrative embodiments.

DETAILED DESCRIPTION OF THE DRAWINGS

Figure 1:
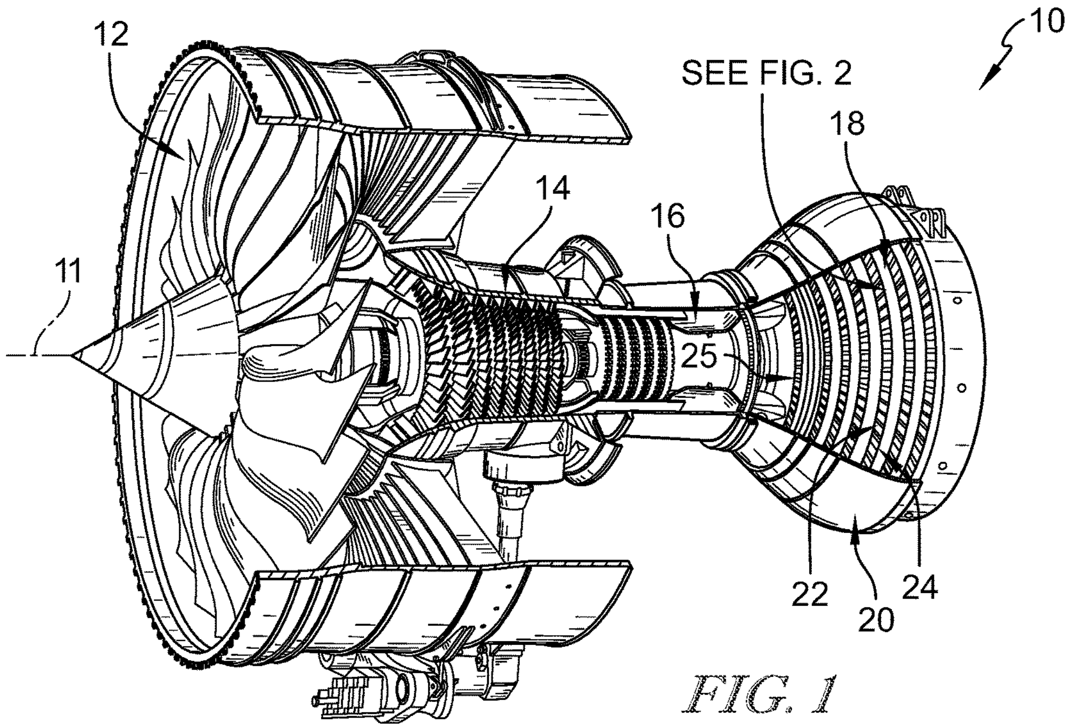
FIG. 1 is a cutaway perspective view of a gas turbine engine that includes a fan, a compressor, a combustor, and a turbine, the turbine including a turbine shroud that extends circumferentially around the axis and turbine wheels that are driven to rotate about an axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
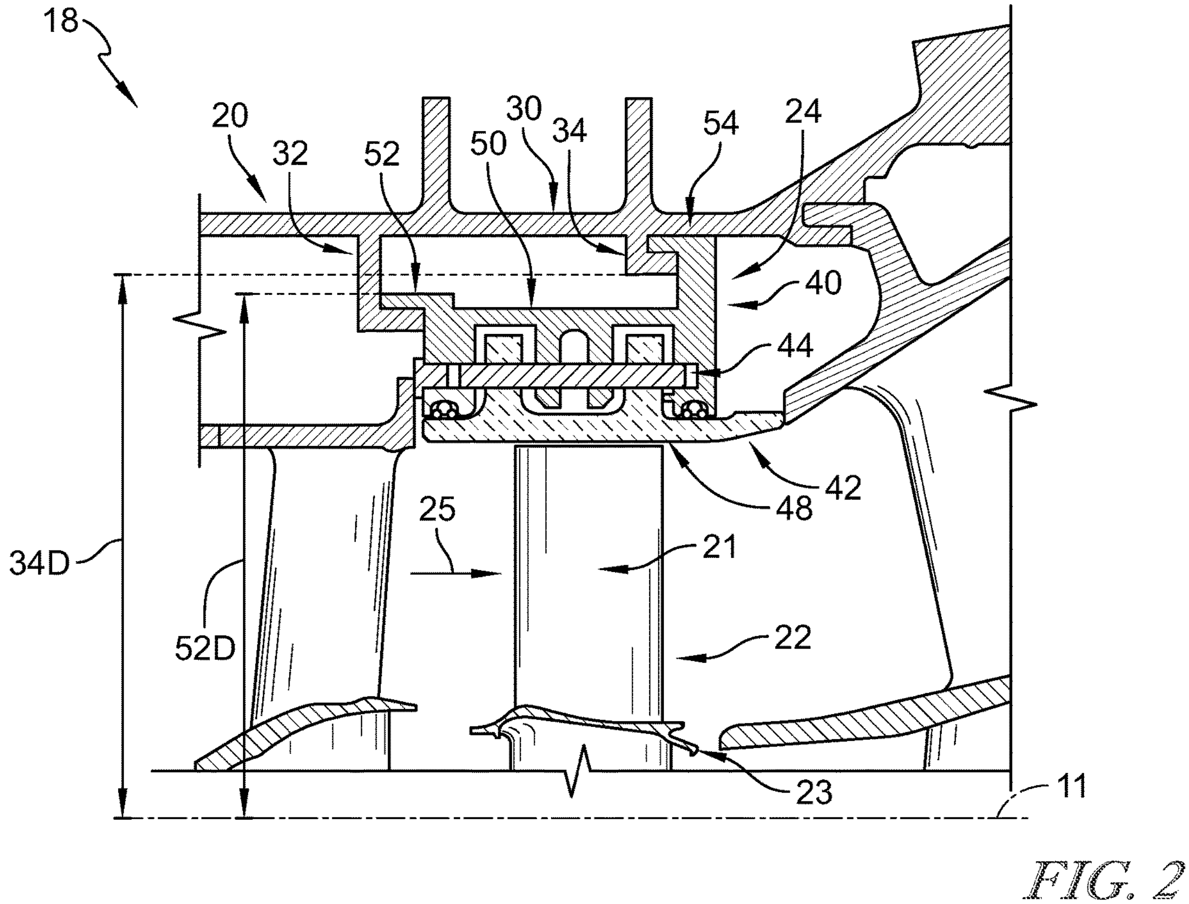
FIG. 2 is a cross-sectional view of a portion of the turbine included in the gas turbine engine of FIG. 1 showing the turbine includes a turbine case that extends circumferentially about the axis of the gas turbine engine and a full ring of shroud segments coupled to the turbine case.

The turbine 18 includes a turbine case 20, at least one turbine wheel assembly 22, and a turbine shroud 24 positioned to surround the turbine wheel assembly 22 as shown in FIGS. 1 and 2. The turbine wheel assembly includes a plurality of blades 21 coupled to a rotor disk 23 for rotation with the rotor disk 23. The hot, high-pressure combustion products from the combustor 16 are directed toward the blades 21 of the turbine wheel assemblies 22 along a gas path 25. The turbine shroud 24 is coupled to the turbine case 20 and extends around the turbine wheel assembly 22 to block gases from passing over the blades 21 during use of the turbine 18 in the gas turbine engine 10. The turbine shroud 24 includes a full ring of shroud segments 24A, 24B in the illustrative embodiment.

The turbine case 20 has forward and aft hangers 32, 34 and each of the shroud segments 24A, 24B has forward and aft hooks 52, 54 that engage the forward and aft hangers 32, 34 of the turbine case 20 to couple the full hoop of shroud segments 24A, 24B to the turbine case 20. The innermost diameter 34D of the aft case hanger 34 is greater than the outermost diameter 52D of the forward hooks 52 of the full ring of shroud segments 24A, 24B so that the forward hooks 52 are able to pass through the aft case hanger 34 prior to engagement with the forward case hanger 32 during insertion of the full ring of shroud segments 24A, 24B into the turbine case 20.

This arrangement of the hangers 32, 34 to the hooks 52, 54 allows the full ring of shroud segments 24A, 24B to be assembled outside of the turbine case 20 before inserting the full ring of shroud segments 24A, 24B is inserted into the turbine case 20. Other embodiments inserting each shroud segment individually and sliding each segment circumferentially around the case to form a full ring. This causes variability of in the gaps between adjacent segments, which may only get larger during use of the gas turbine engine.

Figure 3:
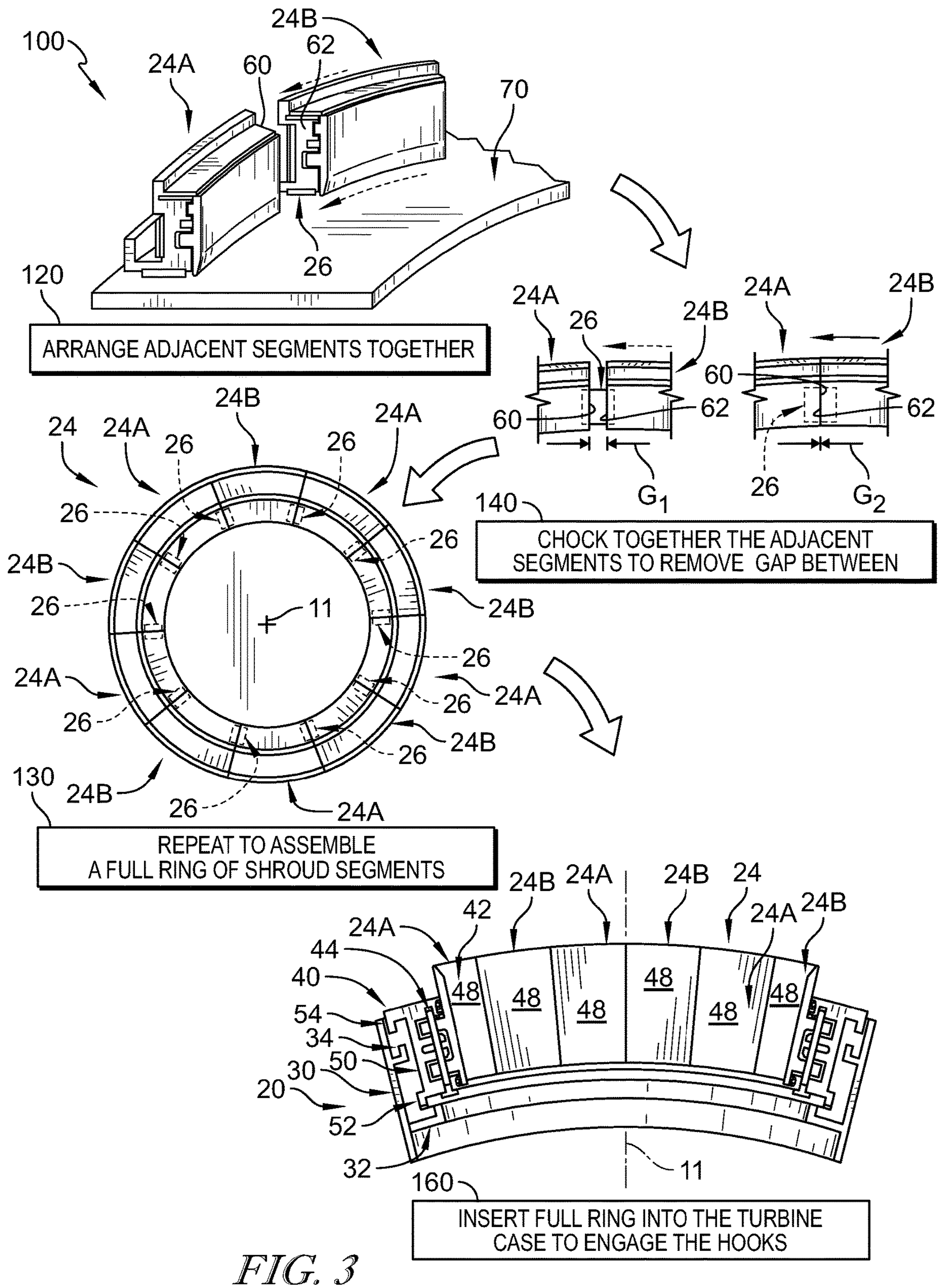
FIG. 3 is a diagrammatic view of a method of assembling the turbine included in the gas turbine engine of FIG. 1.

By assembling the full ring of shroud segments 24A, 24B outside of the turbine case 20, the adjacent shroud segments 24A, 24B may be chocked together to eliminate gaps $G_1$ between the shroud segments 24A, 24B of the full ring of shroud segments 24A, 24B as suggested in FIG. 3. The adjacent segments 24A, 24B may be pushed together to eliminate the gap $G_1$ so that there is no gap $G_2$ between the adjacent segments 24A, 24B. Eliminating the gaps $G_1$ before assembly into the turbine case 20 may help reduce any gaps developed when the turbine case 20 expands due to higher temperatures in the gas turbine engine 10.

Turning again to the turbine 18, the turbine 18 includes the turbine case 20, the full ring of shroud segments 24A, 24B, and strip seals 26 as shown in FIGS. 2 and 3. The shroud segments 24A, 24B are coupled to the turbine case 20 and extends around the turbine wheel assembly 22. Each strip seal 26 extends from each turbine shroud segment 24A, 24B into an adjacent turbine shroud segment 24A, 24B.

The turbine case 20 includes a case shell 30, the forward case hanger 32, and the aft case hanger 34 as shown in FIGS. 2 and 3. The case shell 30 extends around the central axis 11. The forward case hanger 32 extends radially inwardly and axially aftwardly from the case shell 30. The aft case hanger 34 extends radially inwardly and axially aftwardly from the case shell 30.

Each of the shroud segments 24A, 24B includes a carrier 40, a heat shield 42, and a retainer 44 as shown in FIGS. 2 and 3. The carrier 40 extends circumferentially at least partway about the axis 11. The heat shield is supported by the carrier 40 and forms a gas path panel 48 of the shroud segment 24A, 24B. The retainer 44 is configured to couple the heat shield 42 to the carrier 40. The carrier 40 consists of metallic materials, while the heat shield consists of ceramic matrix composite materials in the illustrative embodiment.

The carrier 40 includes a mount panel 50 and the forward and aft hooks 52, 54 as shown in FIGS. 2 and 3. The forward hook 52 extends radially outwardly and forward from the mount panel 50. The aft hook 54 extends radially outwardly and forward from the mount panel 50.

The forward hook 52 of each shroud segment 24A, 24B engages the forward case hanger 32 of the turbine case 20 and the aft hook 54 of each shroud segments engages the aft case hangers 34 of the turbine case 20 as shown in FIGS. 2 and 3. The forward case hanger 32 has a greater radial length than the aft case hanger 34 as shown in FIGS. 2 and 3. Conversely, the aft hook 54 is has a greater radial length than the forward hook 52 as shown in FIGS. 2 and 3. This is so that the innermost diameter 34D of the aft case hanger 34 is greater than the outermost diameter 52D of the forward hooks 52 of the full ring of shroud segments 24A, 24B, which allows the forward hooks 52 to pass through the aft case hanger 34 prior to engagement with the forward case hanger 32 during insertion of the full ring of shroud segments 24A, 24B into the turbine case 20.

Figure 4:
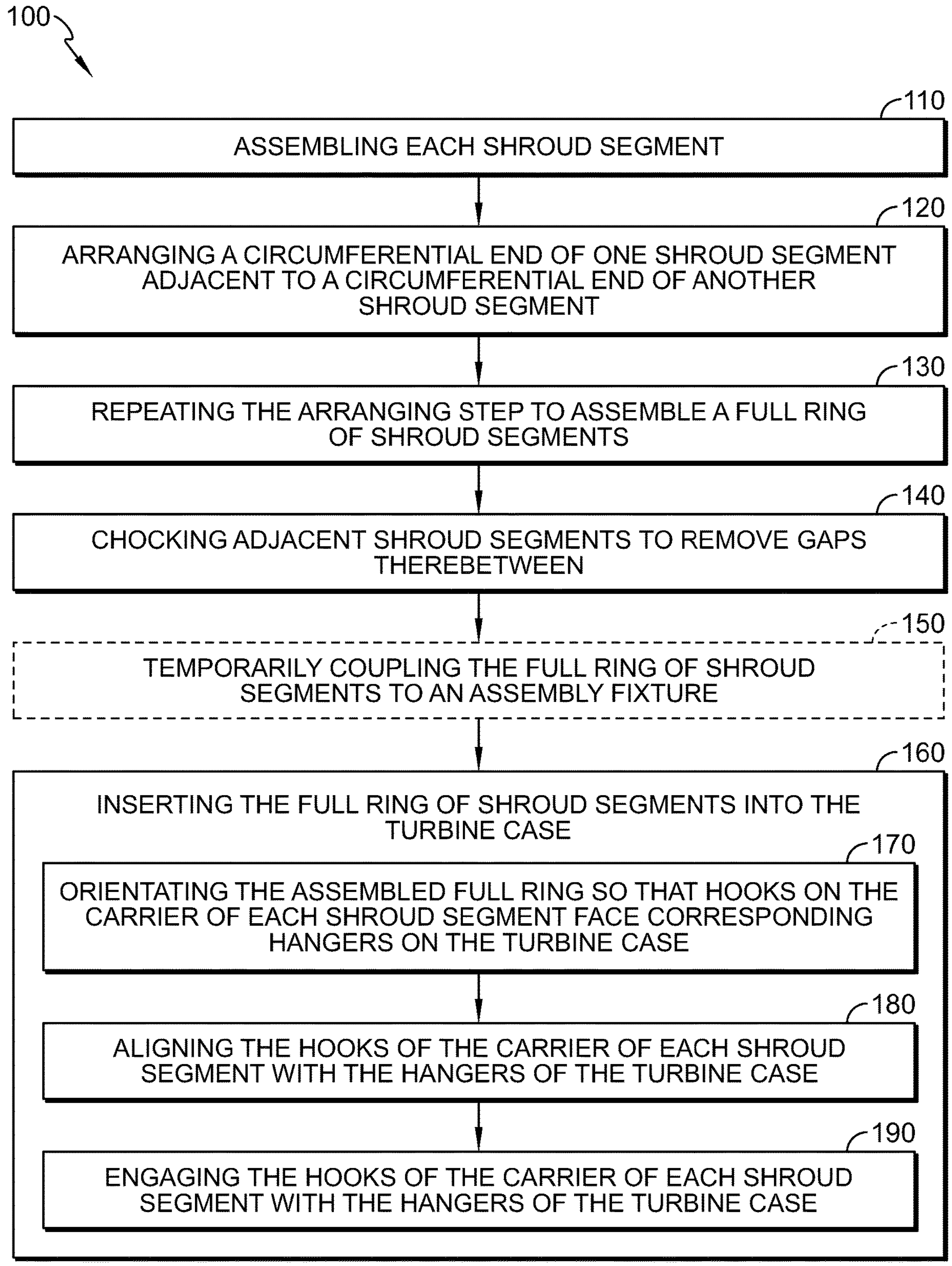
FIG. 4 is a diagrammatic view of the steps of the method of FIG. 3.

A method 100 of assembling the turbine 18 may comprise several steps as shown in FIG. 4. First, each of the turbine shroud segment 24A, 24B is assembled as suggested by box 110. Each of the turbine shroud segment 24A, 24B is assembled by arranging the heat shield 42 adjacent to the carrier 40 and inserting the retainer 44 into the carrier 40 and through the heat shield 42 to couple the heat shield 42 with the carrier 40.

Once the segments 24A, 24B are assembled, the method 100 includes arranging a circumferential end 60 of one turbine shroud segment 24A adjacent to a circumferential end 62 of another turbine shroud segment 24B as suggested by box 120 in FIG. 4. When arranging the adjacent shroud segments 24A, 24B together, one or more strip seals 26 are located circumferentially between the shroud segments 24A, 24B as shown in FIG. 3.

The method 100 includes repeating the arranging step until a full ring of turbine shroud segments is formed as suggested by box 130 in FIG. 4. The method 100 further includes chocking the circumferential end 60 of each shroud segment 24A, 24B together with the circumferential end 62 of adjacent shroud segments 24A, 24B to eliminate gaps between the shroud segments 24A, 24B of the full ring of shroud segments 24A, 24B as suggested by box 140 in FIG. 4. The shroud segments 24A, 24B are chocked together prior to inserting the full ring of turbine shroud segments 24A, 24B into the turbine case 20 as shown in FIG. 3.

In the illustrative embodiment, the method 100 may further include temporarily coupling the assembled full ring of turbine shroud segments 24A, 24B to an assembly fixture 70 as suggested by box 150 in FIG. 4. The full ring of shroud segments 24A, 24B is temporarily coupled to the assembly fixture 70 to maintain relative location of the turbine shroud segments 24A, 24B relative to one another prior to inserting the full ring of turbine shroud segments 24A, 24B into the turbine case 20.

The assembled full ring of shroud segments 24A, 24B is then inserted in to the turbine case 20 as suggested by box 160 in FIG. 4. The full ring of turbine shroud segments 24A, 24B are inserted into the turbine case 20 so that the forward hooks 52 of the shroud segments 24A, 24B engage the forward case hanger 32 of the turbine case 20 and the aft hooks 54 of the shroud segments 24A, 24B engage the aft case hanger 34 of the turbine case 20.

The step of inserting the full ring of turbine shroud segments 24A, 24B into the turbine case 20 may include orientating the full ring of shroud segments 24A, 24B so that the forward hooks 52 of the shroud segments 24A, 24B align with the forward case hanger 32 of the turbine case 20 and the aft hooks 54 of the shroud segments 24A, 24B align with the aft case hanger 34 of the turbine case 20 as suggested by boxes 170, 180. The step of inserting the full ring of turbine shroud segments 24A, 24B into the turbine case 20 may also include engaging the forward hooks 52 of the shroud segments 24A, 24B with the forward case hanger 32 and the aft hooks 54 of the shroud segments 24A, 24B with the aft case hanger 34 as suggested by box 190 in FIG. 4.

The assembly fixture 70 may help with orientating the full ring of shroud segments 24A, 24B to maintain relative location of the turbine shroud segments 24A, 24B relative to one another while the hooks 52, 54 are aligned with the hangers 32, 34. The assembly fixture 70 may then be removed from the full ring of shroud segments 24A, 24B once the full ring of shroud segments 24A, 24B are inserted into the turbine case 20.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of assembling a turbine including ceramic matrix composite heat shields, the method comprising arranging a circumferential end of one turbine shroud segment adjacent to a circumferential end of another turbine shroud segment, wherein each turbine shroud segment includes a gas path panel consisting of ceramic matrix composite material, a forward hook, and an aft hook, the forward hook disposed axially forward of the aft hook with respect to a direction of flow of gas during operation of the turbine, repeating the arranging step until a full ring of turbine shroud segments is formed, inserting the full ring of turbine shroud segments into a turbine case so that the forward hooks of the shroud segments engage a forward case hanger of the turbine case and the aft hooks of the shroud segments engage an aft case hanger of the turbine case, wherein an innermost diameter of the aft case hangers is greater than an outermost diameter of the forward hooks of the shroud segments so that the forward hooks of the full ring of turbine shroud segments are able to pass through the aft case hanger prior to engagement with the forward case hanger during insertion of the full ring of shroud segments into the turbine case.

2. The method of claim 1, further comprising chocking the circumferential end of each shroud segment together with the circumferential end of adjacent shroud segments to eliminate gaps between the shroud segments of the full ring of shroud segments prior to inserting the full ring of turbine shroud segments into the turbine case.

3. The method of claim 2, wherein at least one strip seal extends from each turbine shroud segment into an adjacent turbine shroud segment.

4. The method of claim 1, wherein each turbine shroud segment includes a carrier consisting of metallic materials that forms the forward hook and the aft hook of each shroud segment.

5. The method of claim 1, wherein each turbine shroud segment includes a heat shield consisting of ceramic matrix composite materials that forms the gas path panel of the shroud segment.

6. The method of claim 4, wherein the carrier includes a mount panel, wherein the forward hook extends radially outwardly and forward from the mount panel, and wherein the aft hook extends radially outwardly and forward from the mount panel.

7. The method of claim 1, further comprising temporarily coupling the full ring of turbine shroud segments to an assembly fixture to maintain relative location of the turbine shroud segments relative to one another prior to inserting the full ring of turbine shroud segments into the turbine case.

* * * * *